US009764220B2

(12) United States Patent
Keating et al.

(10) Patent No.: US 9,764,220 B2
(45) Date of Patent: Sep. 19, 2017

(54) JAMMING METHODS AND APPARATUS

(75) Inventors: Steven Keating, Cambridge, MA (US); Neri Oxman, Brookline, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 1486 days.

(21) Appl. No.: 13/463,424

(22) Filed: May 3, 2012

(65) Prior Publication Data

US 2012/0280421 A1      Nov. 8, 2012

Related U.S. Application Data

(60) Provisional application No. 61/482,002, filed on May 3, 2011.

(51) Int. Cl.
| | | |
|---|---|---|
| *E04F 15/10* | (2006.01) | |
| *F16B 7/00* | (2006.01) | |
| *F16B 9/02* | (2006.01) | |
| *A63C 19/04* | (2006.01) | |
| *F16B 4/00* | (2006.01) | |
| *E01C 13/04* | (2006.01) | |

(52) U.S. Cl.
CPC .............. *A63C 19/04* (2013.01); *F16B 4/002* (2013.01); *F16B 7/00* (2013.01); *F16B 9/02* (2013.01); *A63C 2203/16* (2013.01); *E01C 13/04* (2013.01); *E04F 15/107* (2013.01); *E04F 2290/044* (2013.01); *Y10T 403/13* (2015.01); *Y10T 403/25* (2015.01)

(58) Field of Classification Search
CPC .............. A63C 19/04; A63C 2203/16; B28B 1/00–1/54; E01C 13/04; E04F 15/107; E04F 2290/044; F16B 4/002; F16B 7/00; F16B 9/00; F16B 9/02; Y10T 403/13; Y10T 403/25; Y10T 403/251; Y10T 403/26; Y10T 403/341; Y10T 403/35; Y10T 403/45; Y10T 403/47
USPC .......... 403/5, 34, 35, 40, 170, 179, 220, 265
See application file for complete search history.

(56) References Cited

U.S. PATENT DOCUMENTS

| | | | | |
|---|---|---|---|---|
| 5,129,519 | A † | 7/1992 | David | |
| 5,788,078 | A † | 8/1998 | Fuss | |
| 8,475,074 | B1 * | 7/2013 | Henry | ....... B32B 3/26 148/563 |
| 8,882,165 | B2 * | 11/2014 | Lipson | ....... B25J 15/0023 294/188 |

(Continued)

OTHER PUBLICATIONS

Schmidt, I., (1978) "Flexible moulding jaws for grippers", Industrial Robot: An International Journal, vol. 5 Iss: 1, pp. 24-26.

(Continued)

*Primary Examiner* — Josh Skroupa
(74) *Attorney, Agent, or Firm* — Stephen R. Otis

(57) ABSTRACT

A reconfigurable device comprises flexible bladder that encloses a jammable material. The geometry of the device can be altered by unjamming the jammable material (making it flexible), changing the shape of the device while it is flexible, and then jamming the jammable material (making it rigid). In some applications of this invention, a joint connects rigid arms. The ends of the rigid arms are enclosed in the bladder. By varying the stiffness of the jammable material in the bladder, the stiffness of the joint can be controlled.

7 Claims, 13 Drawing Sheets

(56) References Cited

U.S. PATENT DOCUMENTS

2010/0054903 A1* 3/2010 Jones .................. B66C 1/445
414/800
2010/0217436 A1 8/2010 Jones et al.

OTHER PUBLICATIONS

Huijben, F., et al. (2007). Vacuumatics: Shaping space by 'freezing' geometry of structures. Proceedings of the International Conference on Tectonics 2007, Dec. 10-12, 2007, Eindhoven, The Netherlands, (pp. 1-11). Eindhoven: Technische Universiteit Eindhoven.
Huijben, F., et al. (2009). Vacuumatics 3D-Formwork Systems: Customised Free-Form Solidification. In E. Oñate & B. Kröplin (Eds.), Textile Composites and Inflatable Structures IV, (pp. 1-4). Stuttgart: CIMNE.
Steltz, E., et al. (2009) JSEL: Jamming Skin Enabled Locomotion. In IEEE/RSJ International Conference on Intelligent Robots and Systems, 2009. IROS 2009, pp. 5672-5677.
Brown, E., et al. (2010) Universal robotic gripper based on the jamming of granular material. In Proceedings of the National Academy of Sciences of the United States of America, PNAS, Nov. 2, 2010, vol. 107, No. 44, pp. 18809-18814.
Han, H., et al. (2001) Robotic Pinching by Means of a Pair of Soft Fingers with Sensory Feedback. In Proceedings of the 2001 IEEE International Conference on Robotics & Automation, vol. 1, pp. 97-102, 2001.
I. Schmidt, "Flexible moulding jaws for grippers," Indstrial Robot, vol. 5, pp. 24-26, Mar. 1978.†

\* cited by examiner
† cited by third party

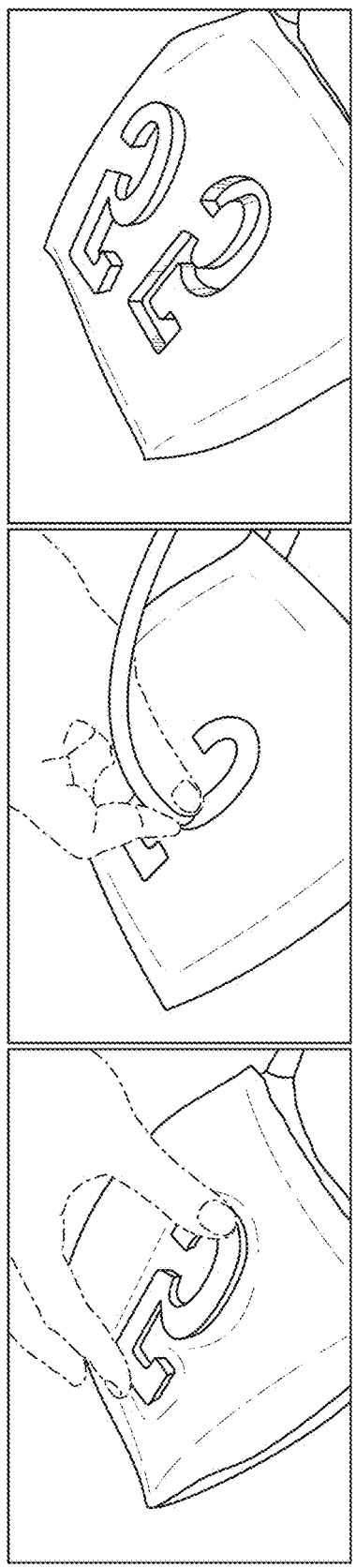
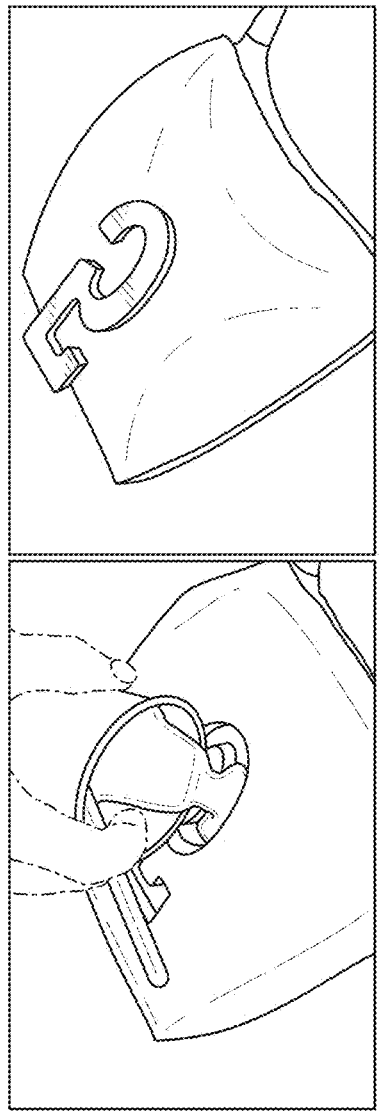
FIG. 8A
FIG. 8B
FIG. 8C
FIG. 8D
FIG. 8E

JAMMING METHODS AND APPARATUS

RELATED APPLICATIONS

This application claims the benefit of U.S. Provisional Application Ser. No. 61/482,002, filed May 3, 2011, the entire disclosure of which is herein incorporated by reference.

FIELD OF THE TECHNOLOGY

This invention relates generally to jammable materials.

SUMMARY

Jamming is a process in which a material becomes more rigid as its density increases. Granular jamming occurs when a system comprised of granular media (for example, sand), takes on a rigid state as the granular media becomes more densely packed.

In exemplary implementations of this invention, jamming is used to control the rigidity of an apparatus. The apparatus comprises a flexible enclosure surrounding a jammable material. The apparatus can be repeatedly reconfigured into different rigid shapes as follows: In each reconfiguration, the apparatus starts in a first rigid shape. The density (and thus rigidity) of the jammable material is reduced until the apparatus is flexible; the apparatus is reconfigured into a second shape, and then the density (and thus rigidity) of the jammable material is increased. At the end of the reconfiguration, the apparatus is again rigid and in the second shape.

In some implementations, a granular media is employed. Advantageously, a granular media allows the pressure acting on the granular media to be varied, which varies the forces acting between individual granular particles (normal forces, friction, Van der Waal forces) and creates a granular network system that has tunable rigidity. This jamming pressure can be due to mechanical squeezing or a difference in fluid pressure with the use of an elastomer bladder to transfer the force. Vacuum pressure is used to achieve the jamming pressure. Alternately, other types of jamming pressures (mechanical, positive fluid pressure) can be utilized. The granular media utilized (e.g., sand or glass beads) results in different mechanical properties of stiffness, flow-resistance, and strength. Having particles with high material coefficients of friction and an interlocking geometry greatly increases the strength and stiffness of the system.

This invention is well suited for use in a variety of applications:

In some implementations of this invention, a joint connects two or more rigid arms. The joint may comprise a flexible bladder that contains the ends of the rigid arms and a jammable material. The stiffness of the jammable material may be varied, in order to vary the stiffness of the joint. Also, the orientations of the rigid arms relative to each other may be changed, by reducing the stiffness of the jammable material, moving the arms, and then increasing the stiffness of the jammable material. The ends of the rigid arms may be interlocking, in order to increase the strength of the joint.

In some implementations, this invention may comprise a pair of soft jaws for a vise. These soft jaws can firmly and rigidly grasp an object of arbitrary shape that might otherwise be damaged by the vise. Each of the soft jaws comprises a flexible bladder with a tough exterior (e.g., a fabric impregnated elastomer bladder) that is resistant to puncture. The bladder encloses a jammable material. Jamming pressure is created both by mechanical pressure from the vise and by vacuum pressure. The vacuum pressure is created by a vacuum pump. The pump evacuates air from the bladder, causing the air pressure inside the bladder to be less than the air pressure outside of it, so that the net air pressure compresses the bladder. The mechanical pressure from the vise is transmitted through the jammable material to the object being grasped. Thus, the mechanical pressure compresses not only the jammable material but also the object being grasped.

In some implementations, this invention comprises a device for replicating the shape of an object. The device comprises a flexible bladder containing a jammable material. When the jammable material is flexible, the object is pressed into the bladder, causing the bladder walls to conform to the shape of the object. This forms a mold that is a negative impression of the object. The density of the jammable material is then increased, until the mold is rigid. The object is removed. Liquid is inserted into the mold, and then solidifies into a casting. The density of the jammable material is reduced (e.g., by inflating the bladder with air), making the jammable material more flexible. The casting is removed and the mold is "erased" as the bladder inflates.

In some implementations, this invention comprises a floor tile. The tile comprises a flexible container that encloses a jammable material. This allows the hardness of the floor tile to be varied by jamming or unjamming. For example, a part of a floor of a gymnasium may be soft for a wrestling match, then hard for a basketball game. In some implementations, a motion sensor can detect a person falling toward the floor tile. In response, the tile can reduce its hardness in real time (by unjamming the jammable material), so that by the time that the person impacts the tile, the tile is soft and flexible. Advantageously, such a floor tile may be used to reduce injuries. For example, an elderly person who falls on such a floor tile would be less likely to suffer a broken hip.

In some implementations, this invention may create optical effects. For example, the jamming system may comprise a flexible bladder that encloses jammable media. The jammable media may comprise glass beads, and a light source may be placed in or behind the jammable media. Internal reflections create a steep cutoff rate for transmittance. Accordingly, the amount of light transmitted through the jammable media depends on the thickness of the jammable media. That thickness can be varied by pressing against the bladder when the media is not jammed. For example, a person may press a hand against the bladder when the media is unjammed. The media may then be jammed, creating a rigid handprint. The thickness of the granular media (and thus the amount of light transmitted) varies at different points of the handprint, creating an optical effect.

The above description of the present invention is just a summary. It is intended only to give a general introduction to some illustrative implementations of this invention. It does not describe all of the details of this invention. This invention may be implemented in many other ways.

BRIEF DESCRIPTION OF THE DRAWINGS

In FIG. 3A, the apparatus is folded into a compact shape; in FIG. 3B, the apparatus is arranged in the shape of a three-legged chair with a back.

FIGS. 8A, 8B, 8C, 8D and 8E show steps in a method of casting using a reconfigurable mold.

In FIG. 8A, an object (in the shape of the number "5") is pressed against a flexible enclosure that contains a jammable material.

In FIG. 8B, a vacuum gives rise to a jamming pressure, which causes the jammable material to become rigid. The portion of the flexible enclosure that is in contact with the object becomes a rigid mold, with a shape that is a negative impression of part of the object.

In FIG. 8C, the object is removed from the rigid mold.

In FIG. 8D, liquid is inserted into the rigid mold, where the liquid solidifies into a casting.

FIG. 8E shows the casting after it has been removed from the mold, and shows the flexible enclosure after the packing density has been decreased and the mold has changed shape, so that it is no longer in the shape of the negative impression.

The above Figures illustrate some illustrative implementations of this invention, or provide information that relates to those implementations. However, this invention may be implemented in many other ways. The above Figures do not show all of the details of this invention.

DETAILED DESCRIPTION

Granular media (for example, sand), will readily display macro-scale properties of a liquid, such as the ability to flow when agitated and assume the geometry of a container holding the media. However, when an outside pressure is applied to the granular media, the interparticle forces (mainly friction and Van der Waals) increase and the granular system displays solid-like properties such as rigidity and a defined shape. This effect is referred to as jamming and is well-known in physics.

A common example of jamming is seen in grain storage hoppers, where the grains at the bottom of the hopper are densely packed and jammed due to the weight of the grains above it. The grains on the top of the hopper are unjammed and can be easily disturbed and shaped, while the grains on the bottom from a rigid, solid-like network.

Jamming pressure may be generated in a variety of ways, including by mechanical pressure, gravity (as seen in the hopper example), air pressure, or other fluid pressures.

Figure 1B:
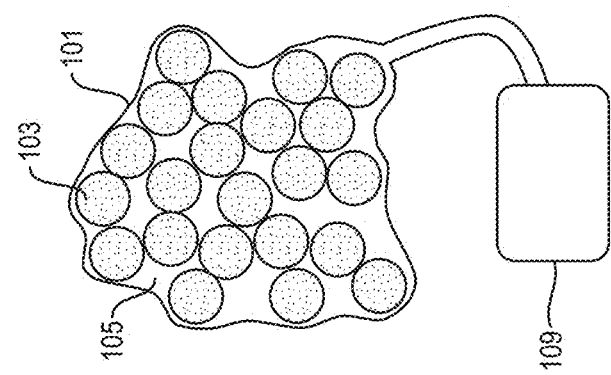
FIG. 1B is a diagram of a granular jammable system in a jammed state.
Figure 1A:
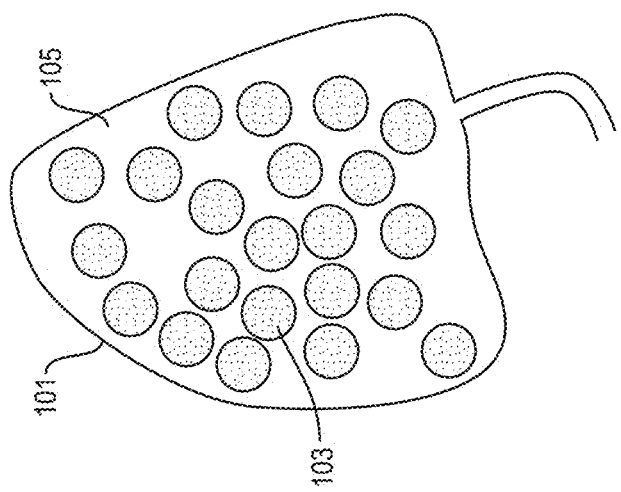
FIG. 1A is a diagram of a granular jammable system in an unjammed state.

In exemplary implementations of this invention, air pressure is used to create a jammed granular system, though other pressure-generating methods can be used. FIG. 1A shows a jammable system in an unjammed state, and FIG. 1B shows the system in a jammed state. An elastomer bladder 101 contains the jammable material. The jammable material comprises a granular media 103 and a fluid 105 that surrounds the granular media. The bladder 101 allows for a vacuum to be established, as an external fluid does not readily penetrate through the bladder. A vacuum pump 109 creates a pressure difference between the internal fluid 105 and the external fluid to establish the jamming force. In the unjammed state (shown in FIG. 1A), the granular media 103 is not under a net pressure difference and the grains can readily slide past one another, creating an easily deformable shape. Upon the application of vacuum pressure applied to the bladder, the grains are packed tightly together due to the weight of the atmosphere and the increased forces between grains create a rigid system where it is difficult to have grains sliding past one another. This densely packed state with an applied pressure is referred to as the jammed state (as shown in FIG. 1B).

The mechanical properties of a jammed system (i.e. strength, stiffness) depend on the pressure applied, as well as on the particle geometry, material, and surface friction. Particles with irregular surfaces and high surface friction will result in a jammed system with higher rigidity. The use of smoother particles will have a lower jammed strength, but will also flow easier when in the unjammed state. A variety of granular media, such as sand, beads, or other small particles can be utilized in a jammable system.

In some implementations of this invention, the fluid inside the bladder 105 and the fluid outside the bladder 107 comprise air. However, other fluids may be used inside or outside the elastomeric bladder to achieve different properties. For example, a liquid (e.g., water) can be used to achieve higher external jamming pressures which results in an increased system rigidity.

Figure 2:
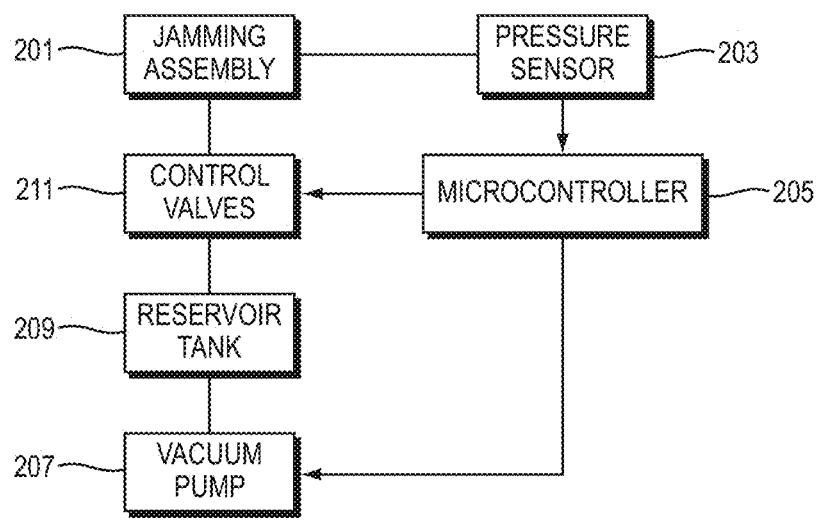
FIG. 2 is a diagram of a granular jammable system where a vacuum pump and atmospheric pressure create the jamming force, with feedback sensors and microcontroller.

A block diagram of a jammable system is shown in FIG. 2. Adding a control loop allows for automated control of the jamming state. A jamming assembly 201 comprises a bladder that encloses a granular media. A pressure sensor 203 inside the bladder provides data to a microcontroller 205 that controls a vacuum pump 207 to control the internal pressure (inside the bladder) and thereby create a jammed or unjammed state when desired. A vacuum reservoir is an evacuated tank 209 which acts as a buffer in order to reduce the time that the vacuum pump 207 has to operate. Control valves 211 regulate the pressure inside the jammed system, which controls the rigidity of the system.

The ability to reversibly transition between jammed and unjammed states allows for a system's rigidity and geometry to be controllable. This ability is implemented in several applications as discussed below.

Granular materials can be jammed into a solid-like state which can support both dynamic and static structural loads. In addition, the granular system can be tuned by controlling the jamming pressure to attain a desired rigidity or a specific shape. Jammable furniture may be created in this way.

Figure 3A:
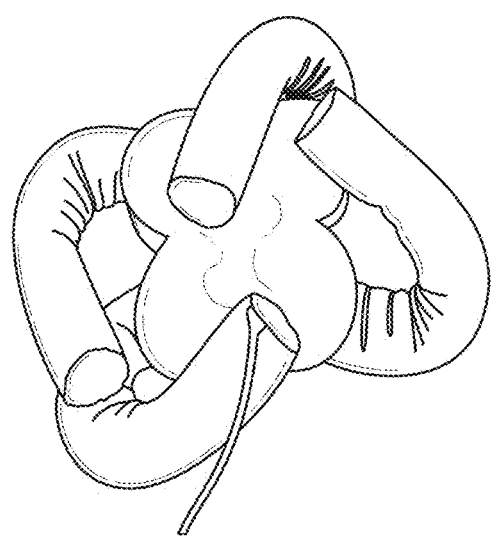
FIGS. 3A and 3B show a jammable apparatus that can be used as a chair.
Figure 3B:
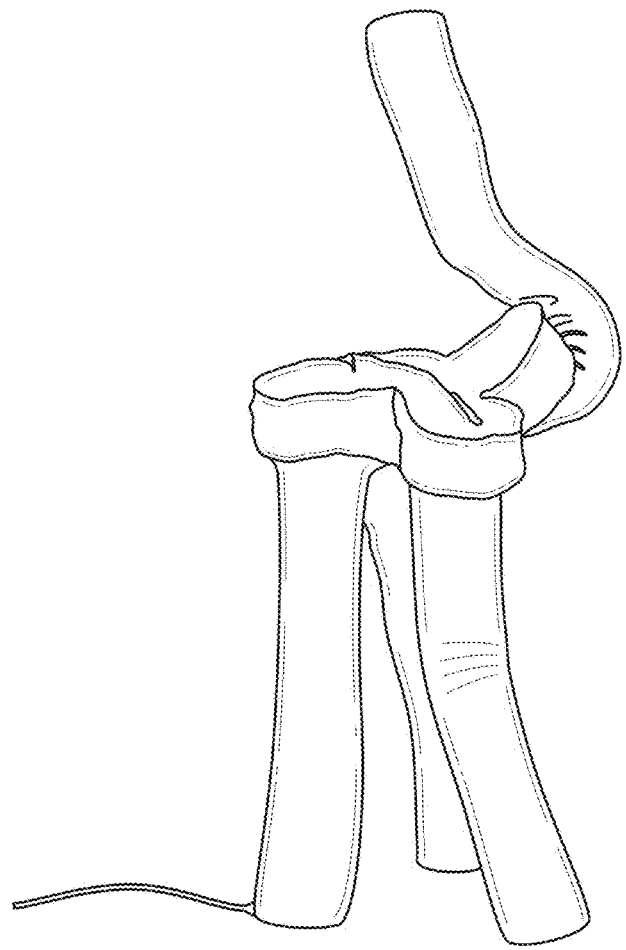

For example, FIGS. 3A and 3B show a working prototype of this invention, which prototype can be used as a chair. In FIG. 3A, the apparatus is folded into a compact shape; in FIG. 3B, the apparatus is in the shape of a three-legged chair with a back.

In this prototype, a jammable chair, when unjammed, is completely flexible and can be arranged into any custom configuration of shapes and angles. Through the use of jamming pressure, the chair can be 'frozen' in any particular configuration and can support a person's weight. Once jammed, the chair does not require further energy input, except to periodically maintain the vacuum pressure as some air does slowly diffuse through the elastomer bladder. This allows for pieces of furniture to be arranged in any position imaginable and then jammed and locked into place. The chair was created using common silica sand as the granular media and a high strength silicone elastomer as the bladder. Sand was used as the granular media due to its high friction and irregularly shaped particles, which result in a high-strength jammed system. Other granular media, such as ceramic hollow microspheres or perlite, can be used to make the chair lighter and maintain similar strengths. The chair's silicone bladder was cast and the sand was added before sealing the sand inside and attaching a tube to allow for vacuum pressure to jam the system. The tube provides a pathway for the air to be removed from inside the chair, creating the pressure difference which jams the system. In order to prevent sand from entering the tube, a small cloth filter is used to allow air to pass through while holding the sand back. An interesting feature of a jammable structure (such as a chair) is its ability to remove dents. If an object strikes the jammed chair, the impact energy is absorbed by the structure through the formation of a dent. To remove the dent, positive pressure can be applied to the chair (essentially blowing the chair up) and then a vacuum can be reapplied to re-jam the system. The dent is quickly removed as the granular media flows back into the region of impact when positive pressure is applied. This combination of geometric configurability and dent-removal makes the range of structural applications quite vast.

Figure 4A:
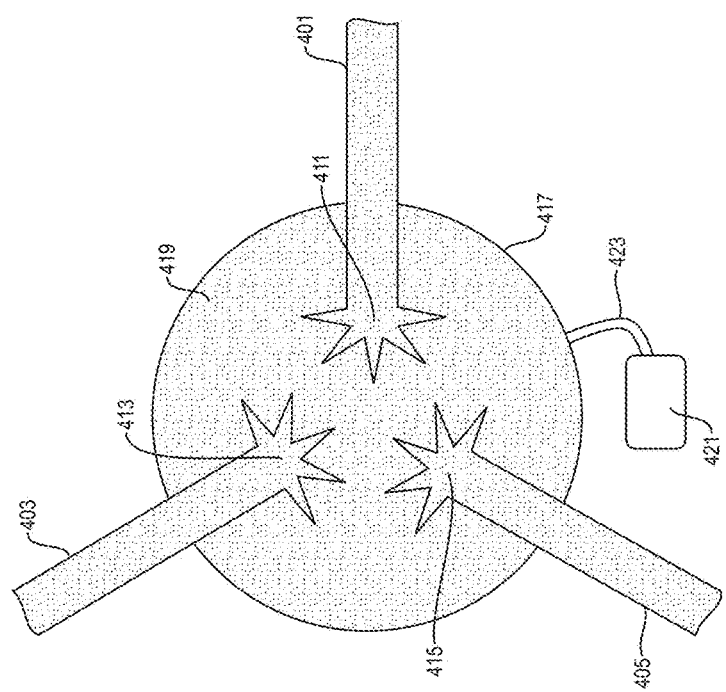
FIG. 4A is a diagram of a jammable joint, where the jamming force is provided by a vacuum pump.

In some implementations, this invention comprises a joint that connects two or more joint arms. The degrees of freedom of all joint arms are unconstrained until a jamming pressure is applied. For example, as shown in FIG. 4A, a joint can join multiple rigid arms 401, 403, 405 each of which have one end 411, 413, 415 inside of an elastomer bladder 417 containing a granular media 419. Upon the application of a jamming pressure (provided by a vacuum pump 421 via a tube 423), the joint become rigid and all degrees of freedom are constrained. In addition, the joint has tunable stiffness (as the stiffness varies with pressure), and can be used for active dampening applications as well. The joint can have any number of arms that can fit within the bladder. The ends of the joint inside the bladder can have a rough shape in order to increase friction and the strength of the joint.

Figure 4B:
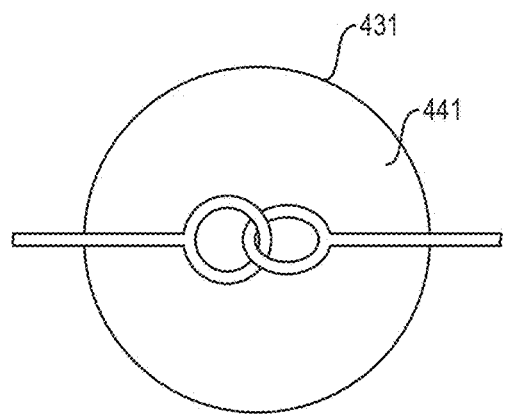
FIGS. 4B and 4C are each diagrams of part of a jammable joint that joins multiple rigid arms, where the ends of the rigid arms are annular and interlock directly with each other. The joint joins two and three rigid arms, respectively, in FIGS. 4B and 4C, respectively.
Figure 4C:
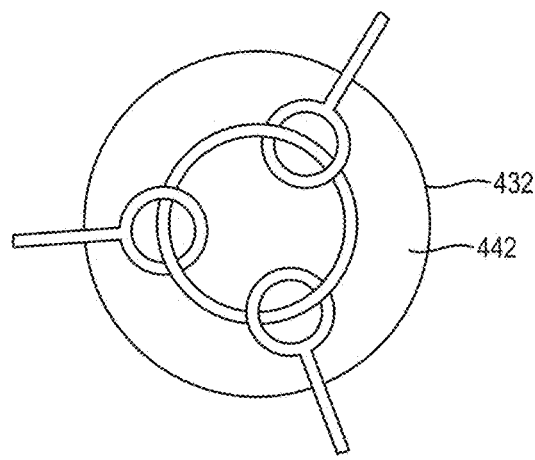

Depending on the particular implementation, the number of joint arms can vary. For example, FIGS. 4B and 4C are each diagrams of part of a jammable joint that joins multiple rigid arms, where the ends of the rigid arms are annular and interlock directly with each other. The joint joins two and three rigid arms, respectively, in FIGS. 4B and 4C, respectively.

Figure 4D:
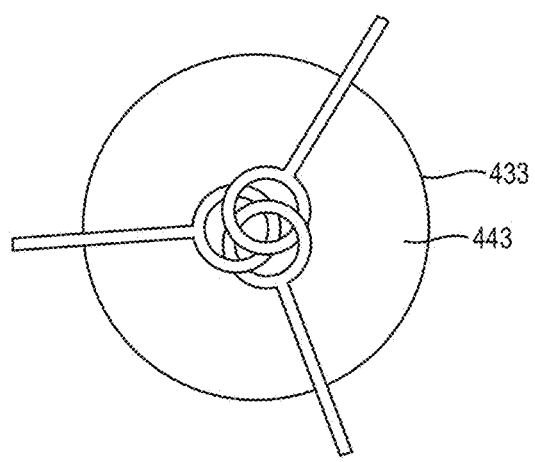
FIGS. 4D and 4E are each diagram of parts of a jammable joint that joins multiple rigid arms, where the ends of the rigid arms are each annular and each interlock with a central annular object. The joint joins three and four rigid arms, respectively, in FIGS. 4D and 4E, respectively.
Figure 4E:
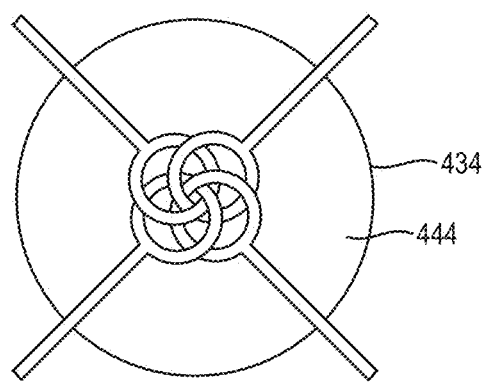

FIGS. 4D and 4E are each diagram of parts of a jammable joint that joins multiple rigid arms, where the ends of the rigid arms are each annular and each interlock with a central annular object. The joint joins three and four rigid arms, respectively, in FIGS. 4D and 4E, respectively.

A joint with loosely interlocking rings (such as those shown in FIGS. 4B, 4C, 4D and 4E) has practical advantages: The interlocking tends to prevent an arm from being torn out and to improve strength. Such a joint is strong and can be rapidly switched between being jammed and unjammed. Such a joint can transmit all types of mechanical movement (rotational, translational) about all axes.

To make joints with specific ranges of allowable motion, constrained joint arrangements can mechanically constrain certain dimensional motion or spatial/angular ranges. The specific shape of the internal joint end may determine the constraining forces.

Figure 4F:
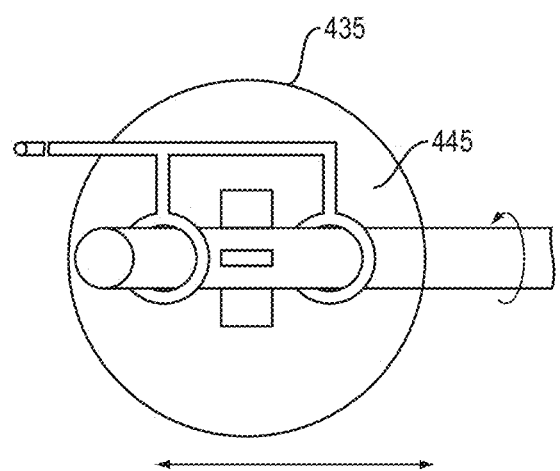
FIG. 4F is a diagram of a part of a jammable joint that joins the ends of two rigid structures. In this joint, a mechanical connection permits the two rigid structures to be displaced relative to each other in only one direction.

FIG. 4F is a diagram of a part of a jammable joint that joins the ends of two rigid arms. In this joint, a mechanical connection permits the two rigid arms to be displaced relative to each other in only one direction. In this joint, the two rigid arms can spin and move towards or away from one another, but any type of bending motion is constrained.

In each case in FIGS. 4B, 4C, 4D, 4E and 4F, a flexible container (431, 432, 433, 434, 435), e.g., an elastomer bladder, encloses a granular media (441, 442, 443, 444, 445) and the ends of the rigid arms.

In some implementations of this invention, jamming is used for precise tuning of the stiffness of the joint and for active dampening as well. Such joints have many practical applications: e.g., joints in a car chassis that go stiff during a crash, soft robotics, and machine design applications.

Jammable systems allow for custom shapes to be easily formed and held with impressive strength. This combination is well-suited for devices which hold irregularly shaped objects.

Figure 5A:
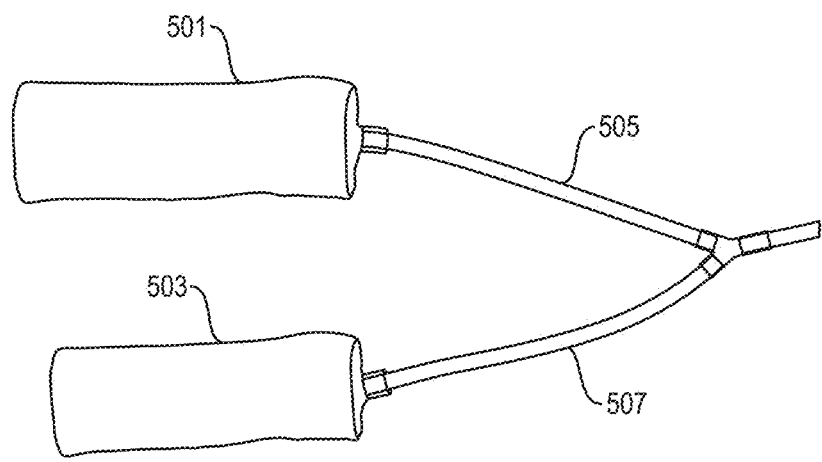
FIG. 5A shows two flexible enclosures that contain jammable material.
Figure 5B:
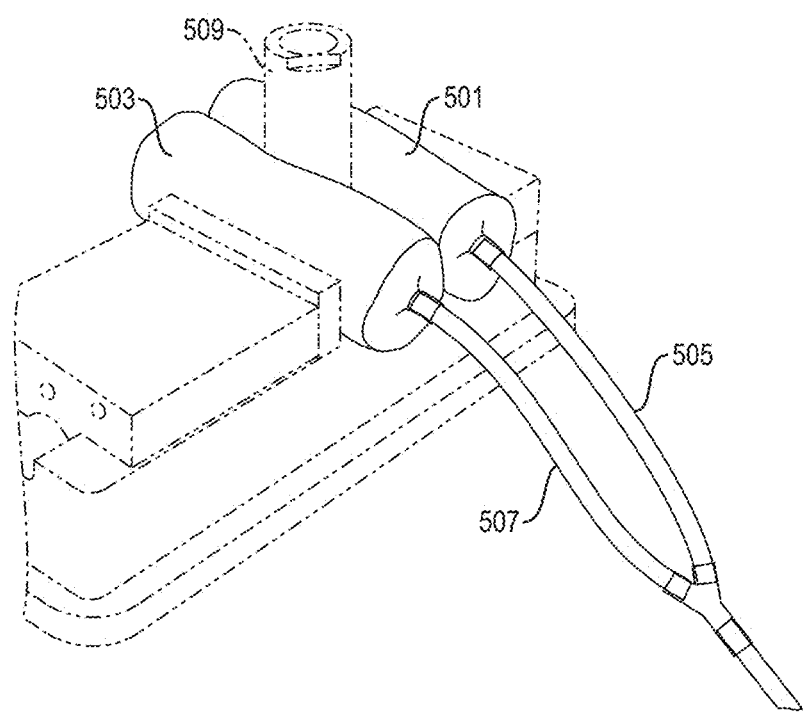
FIG. 5B shows these two flexible enclosures being used to apply compressive force against an object held in a vise.

In some implementations of this invention, a pair of soft jaws attach to a regular vise in order to hold objects securely and prevent indentation damage from the typical gripping teeth (as shown in FIG. 5B). These soft jaws can be useful in machining (where the traditional method of holding oddly-shaped parts is to mill out aluminum blanks in order to hold the part properly).

FIG. 5A shows two flexible enclosures 501, 503 that contain jammable material. FIG. 5B shows these two flexible enclosures being used to apply compressive force against an object 509.

In the example shown in FIGS. 5A and 5B, jammable soft jaws can be jammed using vacuum pressure and then further mechanical pressure from a vise results in an even higher jammed strength. A working prototype was constructed using two fabric-impregnated silicone bladders 501, 503 (the tough fabric improves puncture-resistance), common silica sand as the granular media, and tubes 505, 507 with a sand filter. Advantageously, these soft jaws are well suited for a workshop with air lines. Air lines can provide an easy access point to vacuum pressure through an inexpensive Venturi nozzle.

Figure 6:
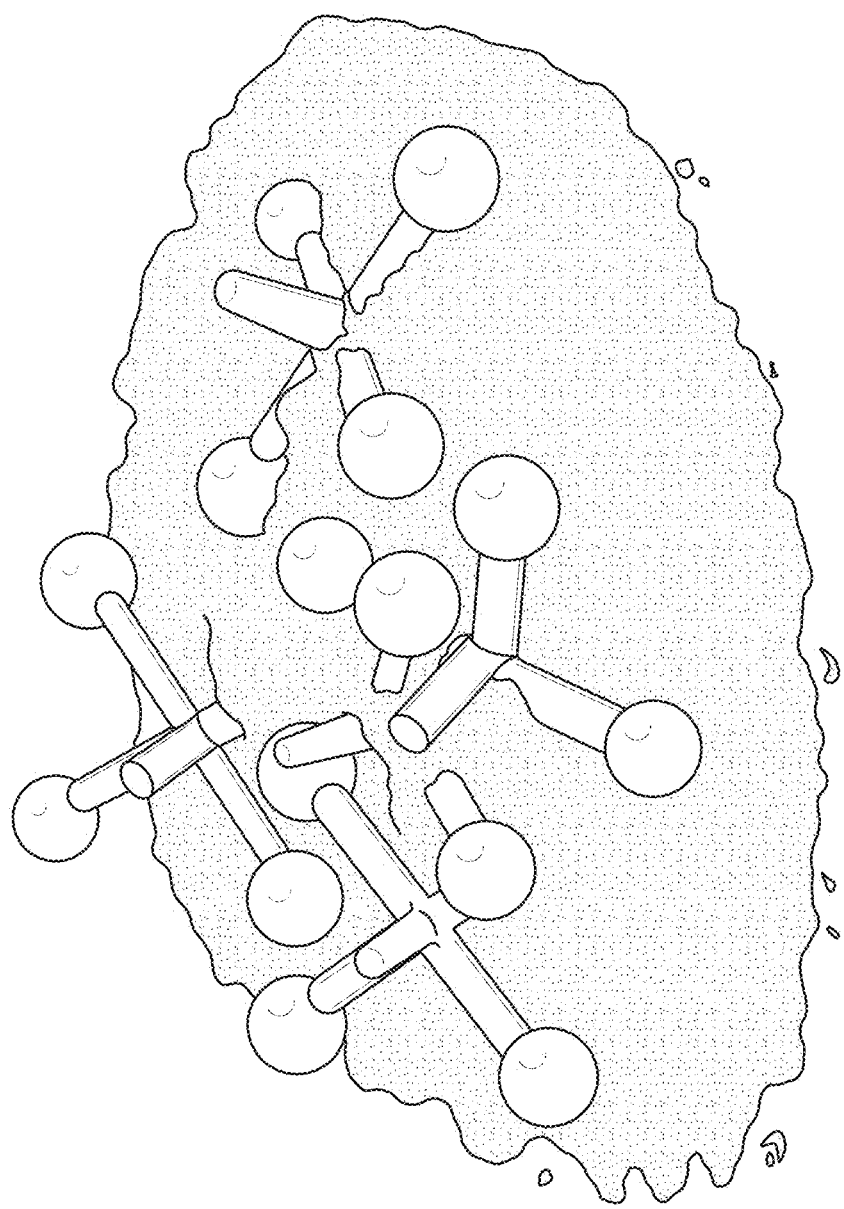
FIG. 6 shows a composite granular media.

Structural jammable systems typically require high strengths, which require jammable media with high friction coefficients and irregular shapes. The use of composite granular media can result in significantly higher jammed strengths, such as when small interlocking particles are mixed with sand (as shown in FIG. 6). These interlocking particles (for example, metal jacks) form lattice networks when jammed, which improves both the compressive and tensile strength immensely. Other interlocking shapes can be used for specific mechanical property improvements.

In some implementations of this invention, different components in a heterogeneous granular media provide different properties for the jammed system. Rather than using a homogenous media like sand or glass beads, by combining different media, specific properties can be enhanced. These composites can take many forms, such as combining sand and metal jacks (as shown in FIG. 6). The sand provides compliance and flow in the unjammed state and in the jammed state the sand provides compressive strength. However the sand particles can slide across one another and in tension there is no strength except the vacuum pressure acting on the system. By introducing jacks, which can entangle and provide tension/bending strength, the composite jammed system gains strength in tension and in bending. Likewise, if the media were only jacks, the system compliance and flexibility in the unjammed state would be very low, and the addition of sand provides this property. The composites can be of different shapes and materials to attain a desired stress/strain response of the system. Composites can also be designed to provide volumetric effects, such as using foams to create larger volume changes and restoring forces when jamming. Optical and magnetic properties could also be tuned through composite jammed structures to provide feedback of the system's state, induce jamming pressure to form different output shapes, or act as a sensor affected by external stimulus.

In some implementations of this invention, jammable materials other than granular media are used. For example, an open-cell foam (such as a soft urethane foam) encased in an elastomer bladder may be used instead of a granular media. Upon the application of vacuum pressure to the inside of the bladder, the foam system decreases in volume until the foam pressure matches the external atmospheric pressure. This collapsed foam structure is much stiffer and provides a framework for floors which can vary in stiffness, either locally or globally. The air pressure into the foam floor tile dictates the stiffness of the floor. This is useful for environments like a gym, where traditionally mattresses are needed to turn a hard floor into a soft floor for various sports. Having an automated system allows for fine tuning of the stiffness of the floor. In addition, individual floor tiles can be separately controlled using a network of pneumatic valves, allowing for a type of large 3D display where each tile acts as a pixel. This controllable floor can reduce injury by rapidly turning soft if a controller determines that a person is falling down.

Figure 7A:
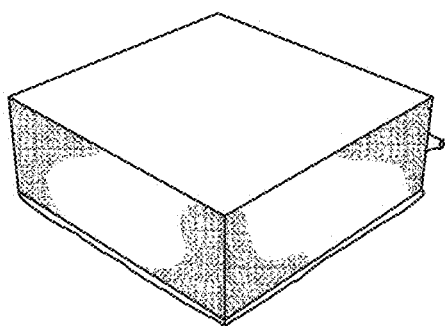
FIGS. 7A, 7B and 7C show a flexible enclosure that contains a jammable media, where the jammable media comprises foam. The jamming pressure increases progressively from FIG. 7A to 7B to 7C, being lowest in FIG. 7A and highest in FIG. 7C.
Figure 7B:
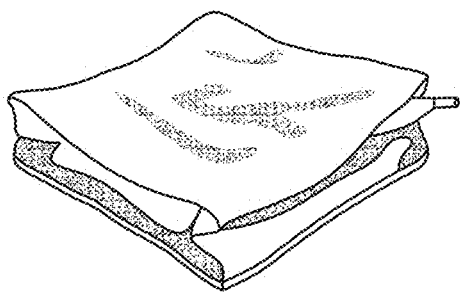
Figure 7C:
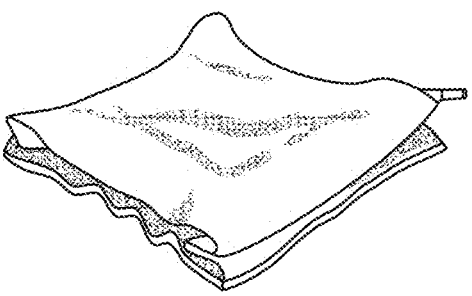

FIGS. 7A, 7B and 7C show a flexible floor tile, in various stages of compression due to vacuum pressure. In the unjammed state, the tile is soft, while in the compressed state, the tile is significantly stiffer. The tile comprises a flexible enclosure that contains soft urethane foam. The foam is a jammable media. The jamming pressure increases progressively from FIG. 7A to 7B to 7C, being lowest in FIG. 7A and highest in FIG. 7C.

Figure 7D:
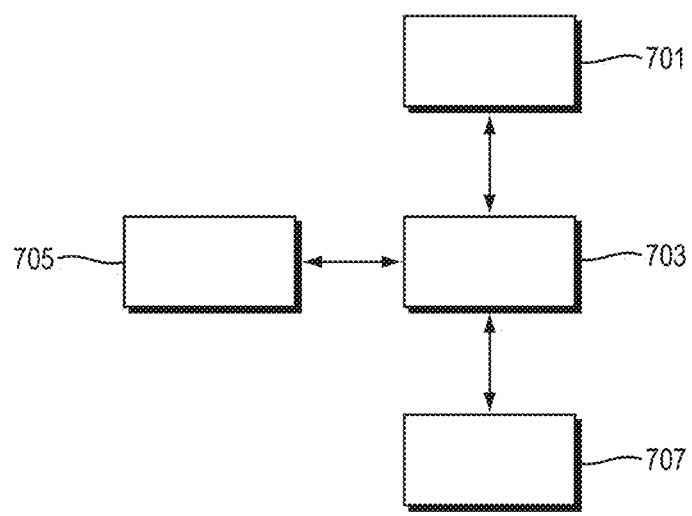
FIG. 7D is a block diagram showing hardware components of a system for real time response to a object that is falling toward a flexible enclosure. The real time response comprises changing the rigidity of a jammable material that is contained in the flexible enclosure.

FIG. 7D is a block diagram showing hardware components of a system for real time response to an object that is falling toward the floor tile. A motion detector 701 can detect an object falling toward the floor tile. A processor 703 can accept data from the motion detector and can generate control signals to control the operation of a vacuum pump 705 and control valves 707 for a reservoir tank. The pump and control valves can be used to control the vacuum pressure in the floor tile and thus to control the degree of rigidity (softness) of the floor tile. For example, in some implementations, a floor tile is ordinarily rigid and firm. However, the floor tile can respond in real time to a falling person, so that by the time the person impacts the tile, the tile has become soft and flexible, reducing the likelihood of injury.

In some implementations of this invention, jamming is used for rapid molding/casting. Sand casting has been around for centuries, but the process is slow and messy. Using jammable materials and a flexible elastomer, an object can be pressed into the media and then once the system is jammed, the shape is retained and casting can be completed. An elastomer bladder can be use for quick casting of plastics and even low temperature metals, and de-molding can be as simple as applying positive pressure to pop the cast object out. In some implementations, this casting approach achieves resolution similar to that achieved by a thermoforming mold, but requires no heat source, wastes no material, and is a faster technique (than thermoforming). Also, the cost of a jammable casting system can be a fraction of the cost of a traditional thermoforming system.

FIGS. 8A, 8B, 8C, 8D and 8E show steps in a process of replicating an object using a jamming technique. The replication system comprises a glass microsphere granular media, a thin soft elastomer (silicone in this particular prototype), a tube with a cloth filter to apply the vacuum pressure, and a vacuum pump.

In FIG. 8A, the object to be replicated has the shape of the number "5". The object is pressed into the unjammed elastomer bladder which is filled with the fine glass microsphere media.

In FIG. 8B, a vacuum is then drawn between the elastomer and the part to be replicated, using a plastic sheet to create a seal. (Alternately, in a two-part mold, another elastomer bladder may be used, instead of this plastic sheet.). With a vacuum formed between the elastomer bladder and the object, a second vacuum is drawn inside of the elastomer bladder, jamming the granular media and creating a rigid mold.

At this point, the plastic plate and the original object can be removed and the jammable media holds the shape of the object, as shown in FIG. 8C.

As shown in FIG. 8D, a liquid casting material is then poured into the resulting mold.

As shown in FIG. 8E, once the casting material has hardened, the cast object is easily de-molded by applying positive pressure into the elastomer bladder, which pops the cast object out of the mold.

In exemplary implementations, this casting method is rapid, inexpensive, and easy to complete. The resolution of this casting method depends on the size of the granular media (the finer the particle size, the higher the resolution), and the thickness of the elastomer (the thinner the elastomer bladder, the higher the resolution). This replication method is well suited for many uses, from prosthetics fabrication to novelty ice cube/chocolate molds, to hobby castings.

In some implementations, this invention is well-suited for artistic and aesthetic uses, because of its reconfigurable geometry.

Figure 9:
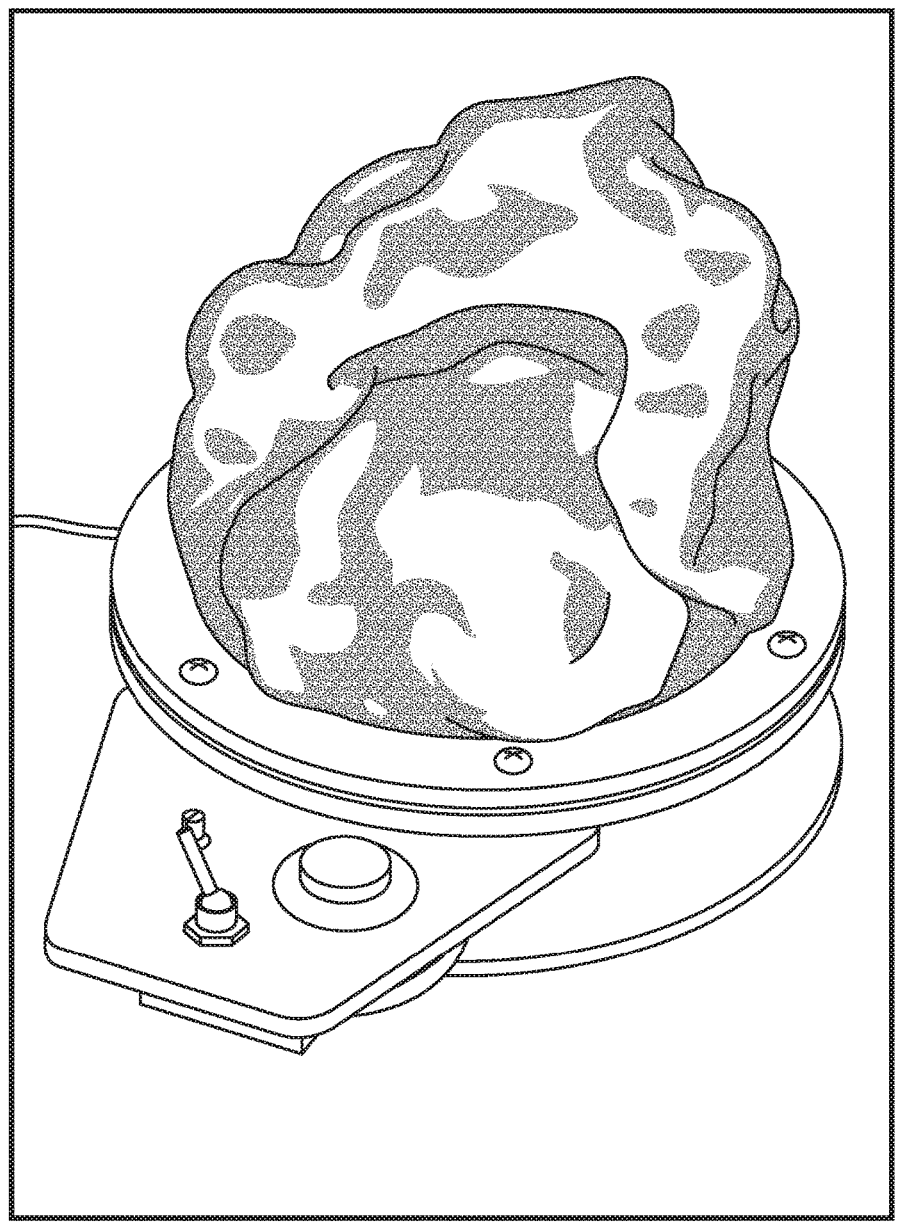
FIG. 9 shows an apparatus that includes a reconfigurable enclosure that contains a jammable material. The jammable material comprises glass beads. The amount of light that is transmitted though the jammable material from a light source depends on the width of the jammable material.

A working prototype of this invention comprises a desktop toy, as shown in FIG. 9. The toy comprises small glass beads as the granular media, a soft silicone as the elastomer bladder, an aluminum frame, an internal light source, and a compact electric vacuum pump. In its unjammed state, the toy is soft to the touch and a variety of shapes can be made by molding the elastomer bladder by hand. The user can then press a button and the jammable material (elastomer and glass beads) become rigid and maintains the current shape. This shape can remain as long as the vacuum pressure is adequate to maintain the jamming effect. If the vacuum pressure is released, the shape morphs back down into the unjammed state. This toy allows for a custom sculpture to be made over and over again.

In the prototype toy shown in FIG. 9, the granular media comprises glass beads, which are transparent. This leads to an optical effect when a light source is immersed in or is behind the granular media. The light is transmitted through the glass beads, but internal reflections create a steep cutoff rate for transmittance, which depends on the thickness of the layer of glass beads. When combined with a soft, clear elastomer (such as the silicone used in the toy), this optical effect causes regions to glow with a brightness that is dependent on the thickness.

Figure 10A:
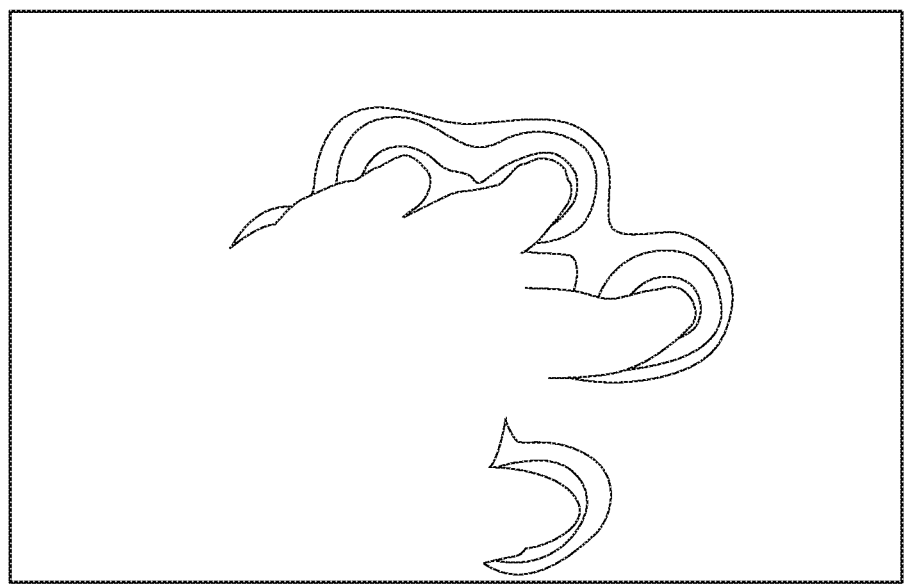
FIGS. 10A and 10B each show a pressure optical effect. The lighting patterns arise because pressure exerted by a hand has produced thinner layers of jammable media.
Figure 10B:
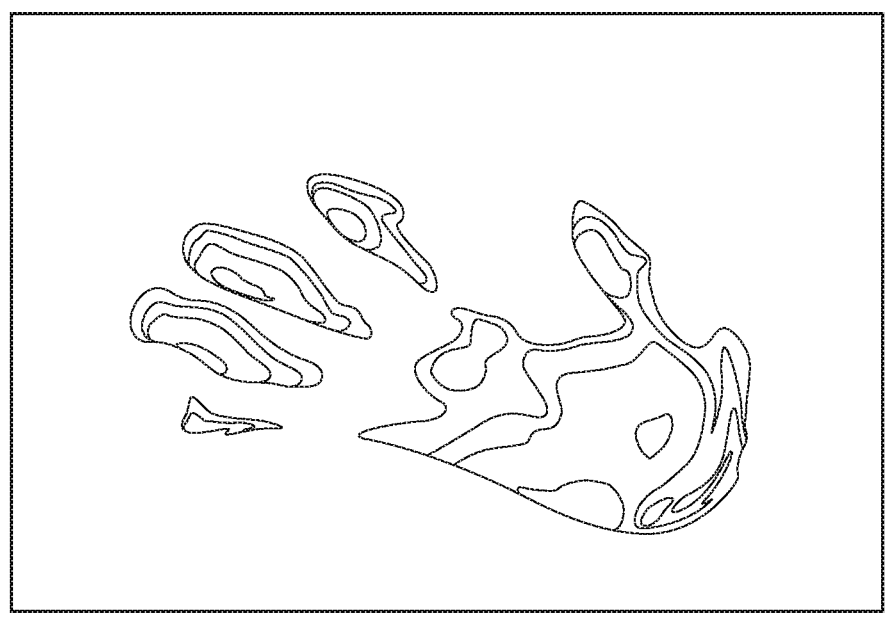

This optical effect can be seen in FIGS. 10A and 10B. As shown in FIG. 10A, user can touch the jammable media. If the system is jammed, the shape is maintained and 3D glowing structures can be rapidly generated, such as the hand print seen in FIG. 10B. The glowing impression can easily be erased by releasing the vacuum pressure and unjamming the system.

In some implementations of this invention, jammable materials can be used to create custom glowing structures. This effect is well suited for use in artistic pieces, toys, or lighting applications.

Definitions and Clarifications:

Here are a few definitions and clarifications. As used herein:

The terms "a" and "an", when modifying a noun, do not imply that only one of the noun exists.

The term "include" shall be construed broadly, as if followed by "without limitation".

The term "or" is an inclusive disjunctive. For example "A or B" is true if A is true, or B is true, or both A or B are true.

A parenthesis is simply to make text easier to read, by indicating a grouping of words. A parenthesis does not mean that the parenthetical material is optional or can be ignored.

Two values are "substantially" equal if they differ by less than 10%.

Two values differ "substantially" if they differ by 10% or more.

Two values differ by a certain percent, if $[(x-y)/x] \times 100$ equals that certain percent, where x is the larger of the two values and y is the smaller of the two values.

Variations

This invention may be implemented in many different ways. Here are some non-limiting examples.

Different means may be used to vary the density of the jammable material. The jammable material may be located within a flexible enclosure (e.g., a bladder). In some implementations, a net difference in fluid pressure inside and outside the enclosure can be used to vary the density of the jammable material. For example, if the external fluid pressure is greater than the internal fluid pressure, the net pressure tends to compress the enclosure, increasing the density of the jammable material. The net pressure is sometimes called a vacuum pressure. The fluid pressure inside the enclosure (or outside the enclosure, if the enclosure is itself surrounded at least in part by another container) may be varied by using a pump, such as a vacuum pump, control valves, reservoir tanks, and tubing or pipes. Seals or gaskets may be used to maintain a net pressure difference. Alternately, air lines and a Venturi nozzle may be used to create a vacuum.

In addition, the density of the jammable material may be varied by changing the amount of mechanical or hydraulic pressure exerted against the exterior or interior of the enclosure. The mechanical pressure may be created by a solid object, e.g. a solid object pressing against the exterior of the enclosure. For example, the mechanical pressure may be exerted by a clamp, or vise, or by an actuator pressing a solid object against the enclosure. Hydraulic pressure may be exerted by a liquid (such as water). The hydraulic pressure may be created by a pump or by gravity (e.g., water pressure from a water tower), or by a fluid stored under or transported under pressure. The hydraulic pressure may be transmitted through pipes or tubes.

This invention may be implemented as a joint that joins two or more rigid structural members, which joint comprises, in combination: (a) a jammable material, (b) a flexible container for containing the jammable material and for containing an end of each of the structural members, respectively, and (c) means for changing the density of the jammable material sufficiently to vary the rigidity of the jammable material. Furthermore: (1) the ends may be annular and interlock directly with each other; (2) the ends may be annular and the joint may further comprise an additional annular part that interlocks directly with each of the ends, respectively; (3) the joint may further comprise a mechanical connection between the ends, which connection permits two of the structural members to be displaced relative to each other in only one direction; (4) the jammable material may comprise a granular solid in a liquid; (5) the flexible container may comprise an elastomer; and (6) the jammable material may comprise a fluid, a granular solid, and other solid components in addition to the granular solid, which other solid components have a different material composition than the granular solid.

This invention may be implemented as a method of using an apparatus to apply a compressive force to an object, wherein: (a) the apparatus comprises multiple, flexible containers each of which contain jammable material, (b) the method comprises the following steps, in combination: moving the containers until at least a portion of the object is in contact with at least part of each of the containers, respectively, and increasing the rigidity of the jammable material by applying external pressure to the least two containers, (c) the external pressure is due, in part, to a net difference between fluid pressure within and without the containers and is due, in part, to an additional pressure, and (d) the compressive force arises, at least in part, from transmission of the external pressure through at least two of the multiple containers to the object. Furthermore: (1) the additional pressure source may comprise pressure from one or more solid objects pressing against one or more of the multiple containers; (2) the jammable material may comprise a fluid and a granular solid; and (3) the jammable material may comprise a fluid, a granular material, and other solid components in addition to the granular solid, which other solid components have a different material composition than the granular solid.

This invention may be implemented as a method of using a device to make a casting of a first object, wherein the device comprises a flexible material containing a jammable material, the method comprising, in combination: (a) reducing the density of the jammable material until the jammable material is flexible, (b) reducing distance between the first object and the device until at least a portion of the first object is in contact with at least part of a surface of the device, (c) increasing the density of the jammable material until the part of the surface becomes a rigid mold that is in the shape of a negative impression of the portion of the first object, (d) removing the first object from the mold, (e) inserting a liquid into the mold and allowing the liquid to solidify into a solid casting, (f) decreasing the density of the jammable material, and (g) removing the casting from the mold. Furthermore: (1) the jammable material may comprise solid granules in a second liquid; and (2) pressure exerted by a third liquid on the exterior of the flexible material may be varied in order to change the density of the jammable material.

This invention may be implemented as a structure comprising, in combination: (a) a flexible enclosure surrounding a jammable material, and (b) means for varying the density of the jammable material, wherein the jammable material comprises a fluid, a granular solid and other solid components, which other solid components have a different material composition than the granular solid. Furthermore: (1) the structure may be adapted to bear an external load when the jammable material is rigid; (2) the structure may be further adapted to undergo repeated reconfigurations, each reconfiguration including a first step in which the structure is in a first rigid shape, a final step in which the structure is in a second rigid shape, and an intermediate step in which the density of the jammable material is less than in the first and final steps and in which the structure changes from the first to the second shape; and (3) the fluid may comprise air.

This invention may be implemented as apparatus comprising, in combination: (a) a flexible enclosure surrounding a jammable material, and (b) a processor for accepting data that indicates that an external object is moving toward the structure and for generating control signals to control a means for changing the density of the jammable material. Furthermore: (1) the apparatus may be adapted to change the density of the jammable material in real time in response to the data; (2) the apparatus may further comprise at least one motion sensor; (3) the jammable material may comprise a foam; and (4) the apparatus may be adapted for use as a component of a floor.

This invention may be implemented as a floor tile comprising, in combination: (a) a flexible enclosure surrounding a jammable material, and (b) means for varying the density of the jammable material in the floor tile.

CONCLUSION

It is to be understood that the methods and apparatus which have been described above are merely illustrative applications of the principles of the invention. Numerous modifications may be made by those skilled in the art without departing from the scope of the invention. The scope of the invention is not to be limited except by the claims that follow.

What is claimed is:
1. A joint that comprises, in combination:
 (a) a first rigid structural member and a second rigid structural member;
 (b) a jammable material, the rigidity of which jammable material depends on the density of the jammable material, such that the jammable material becomes more rigid as the density of the jammable material increases in response to an increase in pressure;
 (c) a flexible container; and
 (d) means for changing the density of the jammable material sufficiently to vary the rigidity of the jammable material;
 wherein
 (i) the jammable material is positioned inside the flexible container,
 (ii) an end of the first rigid structural member is inside the flexible container and is in direct physical contact with the jammable material, and
 (iii) an end of the second rigid structural member is inside the flexible container and is in direct physical contact with the jammable material.

2. The joint of claim 1, wherein the end of the first structural member and the end of the second structural member are annular and interlock directly with each other.

3. The joint of claim 1, wherein the end of the first structural member and the end of the second structural member are annular and the joint further comprises an additional annular part that interlocks directly with each of the ends, respectively.

4. The joint of claim 1, wherein the joint further comprises a mechanical connection between the end of the first structural member and the end of the second structural member, which connection permits the structural members to be displaced relative to each other in only one direction.

5. The joint of claim 1, wherein the jammable material comprises a granular solid in a liquid.

6. The joint of claim 1, wherein the flexible container comprises an elastomer.

7. The joint of claim 1, wherein the jammable material comprises a fluid, a granular solid, and other solid components in addition to the granular solid, which other solid components have a different material composition than the granular solid.

* * * * *